Oct. 5, 1937.  J. M. PRINCELL  2,094,904
METHOD OF PRODUCING LIVESTOCK FOOD FROM GARBAGE
Filed June 6, 1936
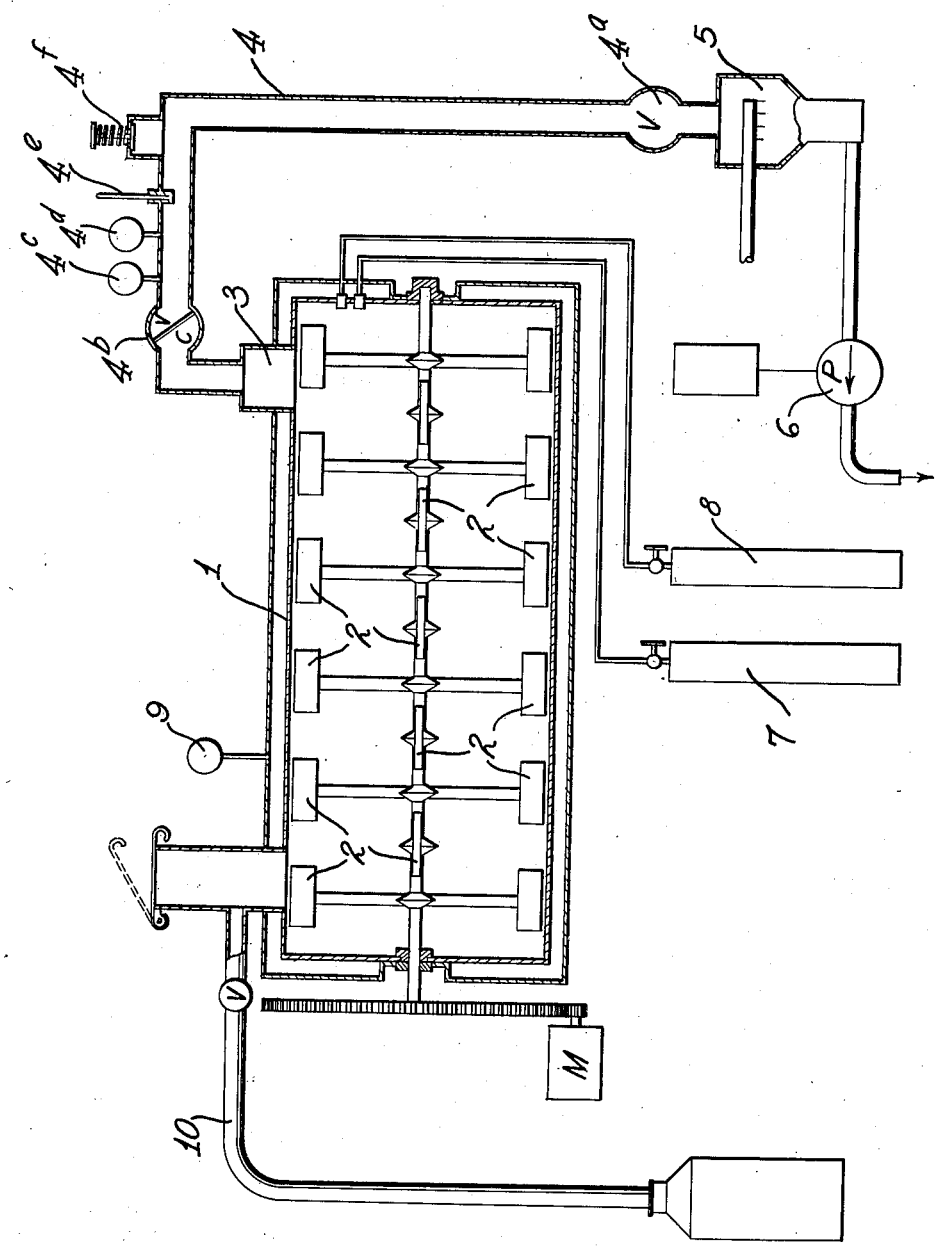
Inventor
John M. Princell
A. B. Bowman
Attorney Patented Oct. 5, 1937

2,094,904

UNITED STATES PATENT OFFICE 2,094,904

METHOD OF PRODUCING LIVESTOCK FOOD FROM GARBAGE

John M. Princell, San Diego, Calif., assignor to American Process Feed Co., a copartnership consisting of John M. Princell, Lawrence Oliver, and Jimmie Meaden, all of San Diego County, Calif.

Application June 6, 1936, Serial No. 83,944

8 Claims. (Cl. 99—149)

My invention relates to a method for producing food for live stock by the reduction of garbage, and the objects of my invention are:

First, to provide a method of treating garbage for sterilizing the same;

Second, to provide a method of treating garbage for deodorizing the same;

Third, to provide a method of treating garbage for destroying the objectionable bacteria;

Fourth, to provide a method of treating garbage to produce a live stock food in which the treated product will keep a long period of time without spoiling;

Fifth, to provide a method of reducing garbage and producing a live stock food therefrom which is very simple and economical and efficient in accordance with the results obtained;

Sixth, to provide a live stock food with a maximum food quality.

With these and other objects in view as will appear hereinafter, my invention consists of the certain novel method of producing a live stock food as will be hereinafter described in detail and particularly set forth in the appended claims, reference being had to the accompanying drawing which forms a part of this application in which:

The figure in the drawing is a diagrammatic view generally of the equipment which may be used in carrying out my process. The equipment may be described generally as follows:

A cylindrical container 1, suitable for several tons of garbage, in the form of a cylindrical drier having a steam jacket, said steam jacket adapted for one hundred pounds or more of steam pressure for externally heating a chamber within the steam jacket, said chamber provided with a plurality of agitators 2 rotatably mounted in the chamber on a shaft in overlapped relation to each other. The steam jacket connects with a steam dome 3 which has a conductor 4 which connects with a condenser 5. The conductor 4 is provided with a shut-off valve 4a, check valve 4b, a pressure gage 4c, a vacuum gage 4d, a thermometer 4e, and a safety valve 4f. Connected with the interior chamber is a cylinder for anhydrous ammonia 7 and a cylinder for chlorine 8, and the steam jacket is provided with a steam gage 9, and also connected with the chamber is a vacuum pump 6 operating in conjunction with condenser 5. There is also provided a vacuum line 10 for drawing in carbohydrates.

My method in connection with the use of the hereinbefore described equipment is as follows:

The raw garbage is placed in the chamber of the receptacle 1 where it is subjected to external heating caused by approximately one hundred pounds pressure in the steam jacket. This will raise the temperature of the garbage in the chamber to 240° to 260° F. which internal pressure is maintained for a period of approximately ten minutes after an internal pressure of twenty pounds per square inch has been reached. After the garbage has been placed in the container 1 before the heat is applied, sodium bicarbonate is injected into the chamber in the proportion of two to four pounds of sodium bicarbonate to one ton of the raw garbage, where it is agitated by the agitators 2. This is done by dissolving the sodium bicarbonate in five gallons of water. A few minutes after the sodium bicarbonate has been injected and thoroughly mixed by agitation, anhydrous ammonia is injected into the garbage chamber in the following proportion: .343 pound in five tons of garbage, and this mixture is thoroughly agitated for a few minutes. Then chlorine gas or any material conveying chlorine of known chlorine content to .657 pound to each five tons of garbage is introduced into the garbage and the mass thoroughly agitated.

It will be here noted that the essential purpose and function of anhydrous ammonia is its effect upon the chlorine gas which causes a preammoniation of the material and increases the efficiency of the chlorine gas. Chlorine alone and by itself is too severe or harsh in its action causing a too sudden oxidation of organic matter and causes bleaching and too much destruction of the vitamins in the material. By the use of ammonia the potential of chlorine is retarded or harnessed and is in a way locked in the material and released by slow liberation over a period of time, thus preserving the material for a longer period than the chlorine alone would do. Furthermore the anhydrous ammonia and chlorine used in the proper proportions as herein set forth tends to prevent phenol taste in the material and thus providing a sweet tasting food. Furthermore, the association of the anhydrous ammonia and chlorine as herein set forth when in combination with moist foods, such as garbage, causes certain compounds to form known as chloramines, which are in varying proportions of mono-chloramine and di-chloramine by the formation of which an effective sterilizing medium is obtained, thus improving the ultimate effect of the chlorine.

It will be here noted that the chemicals sodium bicarbonate, anhydrous ammonia, and chlorine gas should be added to the garbage before the temperature reached 125° F. The mass contained within the chamber including the added chemicals is constantly agitated while the temperature and internal pressure is raised to twenty pounds per square inch with the temperature to 240° to 260° F. and maintained for ten minutes. Then the pressure is released by any suitable means for removing the steam and reducing the pressure to atmospheric within the chamber. Then vacuum is applied by the vacuum pump 6 or any suitable method for reducing the temperature within the chamber to 180° to 190° F. This will take from six to ten inches of vacuum depending upon the moisture content of the mass.

At this point, if desired, an absorbent material, preferably one having nutrious value, such as any good carbohydrate substance such as ground barley, corn meal or mill offal is introduced into the chamber without lowering the vacuum by the use of suction tubes connected with the internal chamber and drawn up through the tube. The quantity of absorbent material to be used depends upon the amount of carbohydrate the live stock food should contain to make a proper balanced ration for live stock.

Then the heat and vacuum is continued increasing the vacuum as high as consistent with drying until the material contains a minimum amount of moisture, the whole process consuming about seven to eight hours from the time the garbage is first introduced into the chamber until it is ready to be withdrawn.

Then the mass is air-cooled and the foreign and deleterious substances such as rags, large bones, metals, and other foreign substances removed by magnetic pulleys and screens and then the mass ground in any suitable manner after which the mass is ready for feeding.

It will be here noted that the equipment disclosed herein is only one form of equipment and may be changed, substituted or varied without in any way affecting my method of producing live stock food. It is only disclosed for illustrative purposes.

Though I have shown and described a particular equipment and method of producing live stock food, I do not wish to be limited to this particular equipment nor to the method as disclosed, but desire to include in the scope of my invention, the method substantially as set forth in the appended claims.

Having thus described my invention, what I claim as new and desire to secure by Letters Patent is:

1. The herein described method of producing live stock food from garbage, consisting in introducing the raw garbage into a closed chamber, then subjecting the garbage to a solution of sodium bicarbonate, then heating said garbage by external application of heat and causing internal pressure in the garbage, then agitating the mass, then injecting anhydrous ammonia into the garbage, then agitating the mass, then introducing chlorine gas into the mass while it is agitated, then removing the steam so that the pressure is brought down to atmospheric pressure, then applying a vacuum to the mass.

2. The herein described method of producing live stock food from garbage, consisting in introducing the raw garbage into a closed chamber, then subjecting the garbage to a solution of sodium bicarbonate, then heating said garbage by external application of heat and causing internal pressure in the garbage, then agitating the mass, then injecting anhydrous ammonia into the garbage, then agitating the mass, then introducing chlorine gas into the mass while it is agitated, then removing the steam so that the pressure is brought down to atmospheric pressure, then applying a vacuum to the mass, then adding an absorbent carbohydrate to the mass.

3. The herein described method of producing live stock food from garbage, consisting in introducing raw garbage into a closed chamber, then subjecting the garbage to a solution of sodium bicarbonate, then causing the moisture in the garbage to create an internal pressure within the chamber by the application of external heat, then injecting anhydrous ammonia into the mass while agitating the same, then injecting chlorine gas into the mass while agitating the same.

4. The herein described method of producing live stock food from garbage, consisting in introducing raw garbage into a closed chamber, then subjecting the garbage to a solution of sodium bicarbonate, then causing the moisture in the garbage to create an internal pressure within the chamber by the application of external heat, then injection anhydrous ammonia into the mass while agitating the same, then injecting chlorine gas into the mass while agitating the same, then removing the steam so that the pressure is brought down to atmospheric pressure and then applying a vacuum to the mass until dry, then adding an absorbent carbohydrate to the mass.

5. The herein described method of producing live stock food from garbage, consisting in introducing raw garbage into a closed chamber, then subjecting the garbage to a solution of sodium bicarbonate, then causing the moisture in the garbage to create an internal pressure within the chamber by the application of external heat, then injecting anhydrous ammonia into the mass while agitating the same, then injecting chlorine gas into the mass while agitating the same, then removing the steam so that the pressure is brought down to atmospheric pressure and then applying a vacuum to the mass until dry, then adding an absorbent carbohydrate to the mass, then removing all deleterious matter from the mass by screening or magnetizing.

6. The herein described method of producing live stock food from garbage, consisting in introducing raw garbage into a closed chamber, then subjecting the garbage to a solution of sodium bicarbonate, then causing the moisture in the garbage to create an internal pressure within the chamber by the application of external heat, then injecting anhydrous ammonia into the mass while agitating the same, then injecting chlorine gas into the mass while agitating the same, then removing the steam so that the pressure is brought down to atmospheric pressure and then applying a vacuum to the mass until dry, then adding an absorbent carbohydrate to the mass, then removing all deleterious matter from the mass by screening or magnetizing, then grinding the material to the proper fineness.

7. The herein described method of producing live stock food from garbage, consisting in introducing the raw garbage into a closed chamber, then subjecting the garbage to a solution of sodium bicarbonate, then heating said garbage by external application of heat and causing internal pressure in the garbage, then agitating the mass, then injecting ammonia into the garbage, then agitating the mass, then introducing chlorine into the mass while it is agitated, then removing the steam so that the pressure is brought down to atmospheric pressure, then applying a vacuum to the mass.

8. The herein described method of producing live stock food from garbage, consisting in introducing the raw garbage into a closed chamber, then subjecting the garbage to a solution of sodium bicarbonate, then heating said garbage by external application of heat and causing internal pressure in the garbage, then agitating the mass, then injecting ammonia into the garbage, then agitating the mass, then introducing chlorine into the mass while it is agitated, then removing the steam so that the pressure is brought down to atmospheric pressure, then applying a vacuum to the mass, then adding an absorbent carbohydrate to the mass, then removing all deleterious matter from the mass.

JOHN M. PRINCELL.